US010349416B2

(12) United States Patent
Bagayoko et al.

(10) Patent No.: US 10,349,416 B2
(45) Date of Patent: Jul. 9, 2019

(54) DEVICE-TO-DEVICE RADIO RESOURCE MANAGEMENT (71) Applicant: NEC Corporation, Tokyo (JP)

(72) Inventors: Abdoulaye Bagayoko, Berkshire (GB); Christian Mouton, Berkshire (GB); Caroline Jactat, Berkshire (GB); Lanto Rakotoharison, Berkshire (GB); Philippe Delahaye, Berkshire (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/774,065

(22) PCT Filed: Mar. 5, 2015

(86) PCT No.: PCT/JP2015/001190
§ 371 (c)(1),
(2) Date: Sep. 9, 2015

(87) PCT Pub. No.: WO2015/141167
PCT Pub. Date: Sep. 24, 2015

(65) Prior Publication Data
US 2016/0381671 A1 Dec. 29, 2016

(30) Foreign Application Priority Data
Mar. 19, 2014 (GB) .................................. 1404952.2

(51) Int. Cl.
H04W 72/04 (2009.01)
H04W 76/00 (2018.01)
H04W 76/14 (2018.01)

(52) U.S. Cl.
CPC ......... H04W 72/048 (2013.01); H04W 76/14 (2018.02); H04W 72/044 (2013.01)

(58) Field of Classification Search
CPC ... H04W 72/02; H04W 72/048; H04W 72/08; H04W 76/023
See application file for complete search history.

(56) References Cited

U.S. PATENT DOCUMENTS

2013/0150051 A1 6/2013 Van Phan et al.
2013/0170414 A1 7/2013 Kwon
(Continued)

FOREIGN PATENT DOCUMENTS

GB 2506886 A 4/2014
WO WO 2011/147462 A1 12/2011
(Continued)

OTHER PUBLICATIONS

Qualcomm Incorporated, "Comparison of Type 1, 2A, 2B D2D Discovery",3GPP TSG-RAN WG2 #84, R2-134336, 3rd Generation Partnership Project (3GPP), Mobile Competence Centre, 650, Route Des Lucioles, F-06921 Sophia-Antipolis Cedex, pp. 1-4, Nov. 2013.
(Continued)

Primary Examiner — Scott M Sciacca
(74) Attorney, Agent, or Firm — Finnegan, Henderson, Farabow, Garrett & Dunner, L.L.P.

(57) ABSTRACT

The present invention provides for a method and related system and communication terminal devices, for assigning a radio resource allocation mode to a mobile radio communications device for device-to-device communication within a wireless communication network environment, the method including the step of identifying at the mobile radio communications device an initial radio resource allocation mode and further including the step of signalling from the network to the mobile radio communications device configuration data relating to an authorized radio resource allocation mode to be employed for the device-to-device communication and defining at least one operation requirement of the mobile (Continued)

radio communications device when employing the said authorized mode.

9 Claims, 6 Drawing Sheets

(56) References Cited

U.S. PATENT DOCUMENTS

| | | | |
|---|---|---|---|
| 2013/0322413 A1* | 12/2013 | Pelletier | H04W 72/1289 |
| | | | 370/336 |
| 2015/0215903 A1* | 7/2015 | Zhao | H04W 72/04 |
| | | | 370/329 |
| 2015/0215981 A1* | 7/2015 | Patil | H04W 76/023 |
| | | | 370/329 |
| 2015/0263840 A1* | 9/2015 | Rastogi | H04L 5/0053 |
| | | | 370/329 |
| 2015/0264677 A1* | 9/2015 | He | H04W 72/02 |
| | | | 370/312 |
| 2015/0271841 A1* | 9/2015 | Yamada | H04W 76/023 |
| | | | 370/329 |
| 2015/0271846 A1* | 9/2015 | Kowalski | H04W 72/14 |
| | | | 370/329 |
| 2016/0212793 A1* | 7/2016 | Jung | H04W 36/0016 |
| 2016/0255669 A1* | 9/2016 | Fodor | H04B 7/0413 |
| | | | 370/329 |
| 2017/0013595 A1* | 1/2017 | Jung | H04W 72/02 |
| 2017/0070986 A1* | 3/2017 | Lee | H04W 36/0061 |

FOREIGN PATENT DOCUMENTS

| | | |
|---|---|---|
| WO | WO 2013/103839 A1 | 7/2013 |
| WO | WO 2013/162193 A1 | 10/2013 |
| WO | WO 2014/003090 A1 | 1/2014 |
| WO | WO 2014/046716 A1 | 3/2014 |

OTHER PUBLICATIONS

U.S. Department of Commerce, "Public safety perspective on resource allocation for D2D group communications", 3GPP TSG-RAN WG1 #76, R1-140427, $3^{rd}$ Generation Partnership Project, Technical Specification Group Radio Access Network; Radio Aspects, Release 12, pp. 1-49, Feb. 2014.

Qualcomm Incorporated et al., "Network-authorised direct communication", SA WG2 Meeting #97, S2-132315, May 2013.

3GPP TR 36.843, V1.2.0, "Study on LTE Device to Device Proximity Services", $3^{rd}$ Generation Partnership Project; Technical Specification Group Radio Access Network, Release 12, pp. 1-49, Mar. 2014.

Search Report in corresponding British Application No. GB 1404952.2 dated Jul. 29, 2014.

International Search Report and Written Opinion dated Jun. 2, 2015.

Notification of Reasons for Refusal Office Action dated Oct. 30, 2018, from the Japanese Patent Office citing references in counterpart Japanese Patent Application No. 2015-544666.

Kyocera, "Resource Allocation Schemes for D2D Communication". 3GPP TSG-RAN WG2#84 R2134311, San Francisco, USA 11 Nov. 11-15, 2013.

Alcatel-Lucent, Chairman's Notes of Agenda Item 7.2.8: Study on LTE Device to Device Proximity Services, 3GPP TSG-RAN WG1#76 R1-141014, Prague, Czech Republic, Feb. 10-14, 2014.

* cited by examiner

DEVICE-TO-DEVICE RADIO RESOURCE MANAGEMENT

CROSS-REFERENCE TO RELATED PATENT APPLICATIONS

This application is a National Stage Entry of International Application No. PCT/JP2015/001190, filed Mar. 5, 2015, which claims priority from British Patent Application No. 1404952.2, filed Mar. 19, 2014. The entire contents of the above-referenced applications are expressly incorporated herein by reference.

TECHNICAL FIELD

The present invention relates to Device-to-Device (D2D) radio resource management and in particularly to a method and related system and communication terminal devices for assigning a radio resource allocation-mode to a mobile radio communications device for D2D communication within a wireless communications network environment.

BACKGROUND ART

Within the Long Term Evolution-Advance (LTE-A) aspects of the $3^{rd}$ Generation Partnership Project (3GPP) enhancements to the Universal Mode Telecommunications System (UMTS) there is included the provision of D2D communication between two appropriately proximate mobile radio communication devices. D2D represents an example of such Proximity Services (ProSe) and the terms can be considered as equivalent and interchangeable when used herein.

Examples of such ProSe devices comprise cellular network User Equipment (UE) devices in which the UEs transmit data signals to each other by way of direct signalling using cellular resources but without the signalling passing through a network base station such as an eNB. The facilitation of D2D communication within a cellular network environment offers a wide variety of advantages such as those arising from the offloading of communication between two UEs from the wireless network, and improvements to local area coverage and resource efficiency, whilst also decreasing the required transmitter power of the UEs.

SUMMARY OF INVENTION

Technical Problem

However, the integration of D2D functionality within a wireless communications network environment requires appropriate management of D2D communication, for example so as to limit its impact on network communications Current proposals exhibit disadvantages particularly as regards the level of efficiency of operation and, in particular, the deployment of radio resources for mobile radio communication devices seeking D2D communication.

The present invention seeks to provide for a method and related system of facilitating D2D communication within a wireless communication network environment and having advantages over known such methods and systems and for example as regards efficiencies of operation and the deployment of radio resources.

Further particular disadvantages are found in current proposed D2D methods and systems and relate in particular to the selection of a radio resource allocation-mode for both D2D discovery and communication signalling and, in particular, the employment of so-called Autonomous Mode radio resource allocation. Potential problems and limitations can arise with regard to the Quality of Service (QoS) provided for D2D radio communications devices and/or potential inefficient use of D2D radio resources particularly as regards the size of an Autonomous Mode pool offering a selection of potential radio resources for use.

In one particular example therefore, the present invention seeks to provide for a method of assigning a radio resource allocation mode, and related system and mobile radio communications network devices, and related computer program products, offering advantageous operation of such methods, systems, devices, and products.

Solution to Problem

According to a first aspect of the present invention there is provided a method of assigning a radio resource allocation mode to a mobile radio communications device for device-to-device communication within a wireless communication network environment, the method including the step of identifying at the mobile radio communications device an initial radio resource allocation mode and further including the step of signalling from the network to the mobile radio communications device configuration data relating to an authorized radio resource allocation mode to be employed for the device-to-device communication and defining at least one operation requirement of the mobile radio communications device when employing the said authorized mode.

The method of invention can prove beneficial in providing an advantageous procedure for a mobile radio communications device to identify the appropriate radio resource allocation mode to be employed. Such advantages arise in particular insofar as the mobile radio communications network within which the device-to-device communication is to be provided can support more than one radio resource allocation mode simultaneously.

Further, the present invention can prove advantageous in readily allowing for the provision of an appropriate level of QoS and/or use of D2D radio resources. If required, a trade-off or balance between QoS and resource can be readily achieved with regard to network capacity.

In one arrangement, signalling can be delivered from the network allowing the mobile radio communications device to identify the said initial radio resource allocation mode.

In particular, such signalling can be provided within a System Information Broadcast (SIB) message and generally within a new Information Element (IE).

Further, the configuration data can advantageously include a maximum number of radio resources to be offered to the mobile radio communications device.

Also, the configuration data can include parameters relating to the length of time the mobile radio communication device remains in the said authorized mode.

Advantageously, the said at least one operational requirement can be that the mobile radio communication device should only use the authorized mode during a certain time period.

Also, the operation requirement can be that the mobile radio communications device should employ the authorized mode only for a certain number of Resource Blocks.

Yet further, the operational requirement can be that the mobile radio communications device should only use the authorized mode for a certain amount of data.

Still further, the operational requirement can be that the mobile radio communication device employ the authorized mode only insofar as a minimum observed Quality of Service level is met.

Advantageously, such operational requirement in relation to QoS can employ a sub-parameter for QoS observation. Also a sub-parameter can be employed for checking the observed QoS.

As a particular feature, the method can employ a combination of any one or more of the aforementioned operational requirements and with any such combination of the requirements being included on a logical "AND", a logical "OR", or indeed any other logical-operator basis.

Yet further, the method can employ a step of the device reporting to the network if at least one operational requirement of the mobile radio communications device is no longer met.

The said operational requirement can also relate to a reporting option of the mobile radio communications device.

In particular, one reporting option can be employed for the mobile radio communications device to determine if it is expected to report to the network.

As a further example, a reporting option can be employed for the mobile radio communications device to determine if it is expected to report to the network on a periodic basis. In particular the frequency of such periodic reports can likewise be indicated within the reporting option.

Yet further, the operational requirement can comprise a reporting option serving to identify the metrics to be used for reporting.

In accordance with a particular embodiment of the present invention, the authorized mode comprises a radio resource allocation autonomous mode.

Further, the said initial radio resource allocation mode can comprise a radio resource allocation autonomous mode.

As a further example, the initial mode can comprise a radio resource allocation scheduled mode.

In such aspect, the method can employ a step, prior to the signalling of the configuration data, of the mobile radio communications device sending a D2D service request signal to the network.

The invention can further employ a step of the network authorizing autonomous mode employment in response to the said request.

As a further advantageous aspect, and with the said initial mode comprising scheduled mode, the network can advantageously identify all mobile radio communication devices within the network environment able to employ D2D communication.

As such, the network can advantageously predict the likely load on an autonomous mode pool of autonomous mode radio resource allocations to be authorized.

Yet further, the signalling carrying the configuration data can be implemented employing a new Medium Access Control (MAC) element and the configuration data can be delivered as a new information element by SIB, or a MAC control element or by way of a Radio Resource Control (RRC) dedicated message.

According to another aspect of the present invention there is provided a system for assigning a radio resource allocation mode to a mobile radio communications device for device to device communication within a wireless communication network environment, the mobile radio communications device of the system being arranged to identify an initial radio resource allocation mode, and the system further being arranged to signal from a network element to the mobile radio communication device network configuration data relating to an authorized radio resource allocation mode to be employed for device-to-device communication and defining at least one operational requirement of a mobile radio communications device when employing the said authorized mode.

As with the above method, the system can exhibit advantages for a mobile radio communications device to identify the appropriate radio resource allocation mode to be employed.

In one arrangement, the system can be configured to receive signalling from the network and serving to identify the said initial radio resource allocation mode.

The network can be arranged to provide configuration data including a maximum number of radio resources on offer to the mobile radio communications device. Also, the network can be arranged to provide configuration data including parameters relating to the length of time that the mobile radio communication device can remain in the said authorized mode.

Advantageously, the said system can be arranged such that the said at least one operational requirement can comprise any one or more of:

the mobile radio communication device only using the authorized mode during a certain time period;

the mobile radio communications device employing the authorized mode only for a certain number of resource blocks RB;

the mobile radio communications device only using the authorized mode for a certain amount of data; and the mobile radio communication device employing the authorized mode only insofar as a minimum observed QoS level is met.

Of course, the system can employ a combination of any one or more of the aforementioned operational requirements and with any such combination of the requirements being included on a logical "AND", a logical "OR" basis, or indeed any other logical operator basis.

The mobile radio communications device of the system can be arranged to report to the network if at least one operational requirement of the mobile radio communications device is no longer met.

Further, the mobile radio communications device of the system can be arranged to determine if it is expected to report to the network on a periodic basis, and if so at what frequency.

In one particular aspect, the mobile radio communications device can be arranged to send a D2D service request signal to the network and prior to the signalling of the configuration data from the network.

The system can further be arranged such that, with the said initial mode comprising scheduled mode the network can identify all mobile radio communication devices within the network environment able to employ D2D communication.

As will be appreciated from the above, the system embodying the invention can operate according to any one or more of the further mentioned steps noted above.

According to a further aspect of the present invention there is provided a network element of a wireless communication network and arranged to transmit to a mobile radio communications device within the network signalling including configuration data relating to an authorized radio resource allocation-mode to be employed by the mobile radio communications device for D2D communication, the configuration data defining at least one operational requirement of a mobile radio communication device when employing the said authorized mode.

The network element can be arranged to deliver signalling is delivered from the network allowing the mobile radio communications device to identify the said initial radio resource allocation mode.

In particular, the network element can be arranged to provide, such signalling within a System Information Broadcast (SIB) message and generally within a new Information Element (IE).

The network element can be arranged to provide configuration data according to any one or more of the data and/or parameter features outlined above in relation to the method of the invention.

The network element can of course be arranged to assign an authorized mode comprising a radio resource allocation autonomous mode.

Further, the network element can be arranged to receive, prior to the signalling of the configuration data, a D2D service request from the mobile radio communications device.

The network element can be arranged to then authorize autonomous mode employment in response to the said request.

Yet further, the network element can be arranged to identify all mobile radio communication devices within the network environment that might employ device-to-device communication.

According to a yet further aspect of the present invention there is provided a mobile radio communications device arranged for D2D communication within a wireless communication network and arranged to identify an initial radio resource allocation mode and subsequently to receive signalling from a network terminal containing configuration data relating to an authorized radio resource allocation mode to be employed for the device-to-device communication, and the configuration data defining at least one operational requirement of the mobile device when employing the said authorized radio resource allocation mode.

The mobile radio communications device is advantageously arranged to receiving signalling identifying the said initial radio resource allocation mode.

As above, the configuration data to be received and to-which the mobile radio communication device should be responsive can comprise any one or more of the elements, parameters and requirements outline above.

The configuration data can advantageously include a maximum number of radio resources on offer to the mobile radio communications device.

The mobile radio communications device is advantageously arranged to report to the network if at least one operational requirement of the mobile radio communications device is no longer met with the device.

As above, the operational requirement can relate to a reporting option of the mobile radio communications device.

In such aspect, the method can employ a step prior to the signalling of the configuration data of the mobile radio communications device a device-to-device serving request signal.

According to yet further aspect of the present invention there is provided a method of receiving an assignment of a radio resource allocation mode at a mobile radio communications device for D2D communication within a wireless communication network environment, and including the step of identifying at the mobile radio communications device an initial radio resource allocation mode and further including the subsequent step of receiving at the mobile radio communications device signalling from the network including configuration data relating to an authorized radio resource allocation mode to be employed by the mobile radio communication device for the D2D communication, and including operational requirement of the mobile radio communications device when employing the said authorized mode.

This yet another aspect of the present invention exhibits advantages such as those noted above, and can also employ the further method steps noted above.

According to a still further aspect of the present invention there is provided a computer program product for a computer device, and including containing software code which, when loaded onto a computer device, is arranged to perform a method as outlined above.

Of course, the computer program product can comprise a computer-readable medium and/or be directly loadable into the computer device.

BRIEF DESCRIPTION OF DRAWINGS

The invention is described further hereinafter, by way of example only, with reference to the accompanying drawings in which.

DESCRIPTION OF EMBODIMENTS

The particular illustrated embodiment of the present invention relates to an arrangement comprising a method and related system by which a mobile terminal device of a wireless communication network, such as for example a UE operating in a cellular network, can be authorized to employ an appropriate radio resource allocation mode so as to arrive at particular advantages with regard to Quality of Service levels and radio resource employment.

In the illustrated example, reference is made to two particular radio resource allocation modes proposed for D2D communication and comprising so-called Autonomous Mode allocation and Scheduled Mode allocation.

Such two modes of resource allocation have been defined within 3GPP discussions for proximity services such as D2D and relating to both discovery and communication signalling.

Autonomous Mode, which is generally identified as "Type 1" for discovery signalling and "Mode 2" for communication signalling, allows a UE to perform D2D transmission autonomously and so thereby autonomously determine which radio resource to employ. Such determination can be based upon a multi-access protocol which, for example, can be similar to known CSMA-CA or WiFi multi-access protocols. The radio resources are then chosen by the UA in an autonomous manner from a pool of radio resources, which pool can be explicitly configured by the network. Such configuration can be provided by network terminal device, such as an eNB, and so that the resources are then made available for D2D transmission, and thus not permitted for use in legacy cellular uplink allocation.

For Scheduled Mode allocation, generally identified within the context of 3GPP as "Type 2B" for discovery signalling and "Mode 1" for communication signalling, the eNB is arranged to allocate a particular radio resource to the UE for D2D signalling in a scheduled manner which can, for example, be similar to the manner employed for legacy cellular uplink allocation, and as in response to a request from the UE.

The 3GPP discussions further define that the choice of radio resources to be allocated for any UE can be under the control of the network operator. However there has been no discussion or appreciation of how a particular UE might identify which radio resource allocation mode to employ and, as such, various disadvantages as discussed above, and relating in particular to quality of service and resource-employment efficiency are envisaged.

Such disadvantages are considered more relevant insofar as the 3GPP discussions have allowed for a network environment, such as the cells of a cellular network, to support both the Autonomous and Scheduled Radio Resource allocation-modes simultaneously. In particular, it is envisaged that a strategy might be employed where Autonomous Mode resource allocation can be employed for UEs located near the cell edge, primarily since scheduled mode is difficult to apply in inter-cell environments, and that Scheduled Mode tends to be employed for UEs located more centrally within the cell. It will therefore to be apparent that some proximity service users such as UE devices seeking D2D communication and operating within the same cell, will be served by way of Autonomous Mode resource location, where others in the cell will be served through Scheduled Mode resource allocation.

Figure 1:
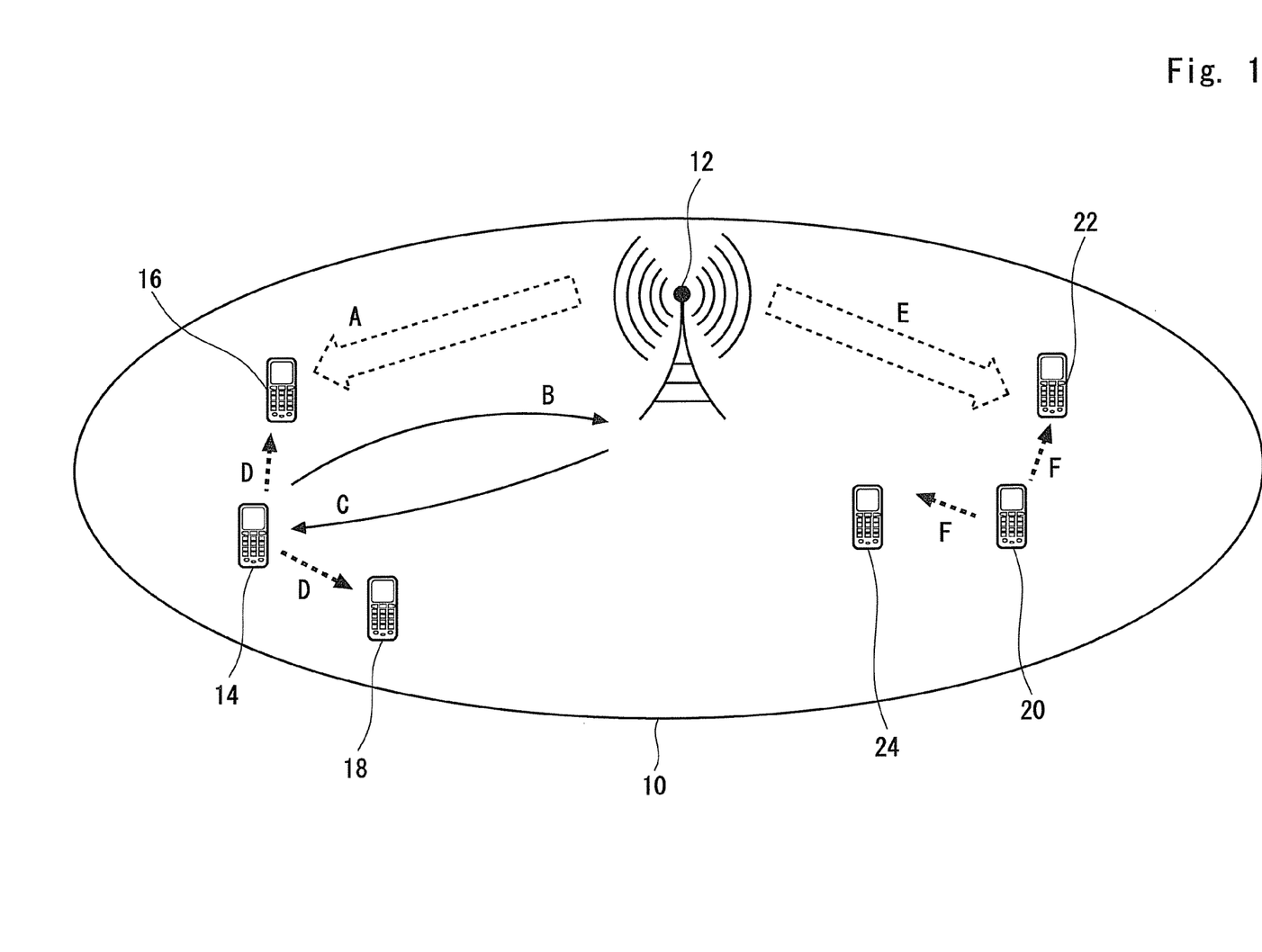
FIG. 1 is a schematic representation of D2D communication provided within a cellular network environment.

Reference is now made to FIG. 1 which provides a schematic illustration of such potential common deployment of resource allocation modes within a common network environment.

Within FIG. 1, the common network environment comprises a cell 10 of a cellular network and illustrated with its network terminal device, eNB 12.

Within the cell 10 are a plurality of UEs 14-24 seeking D2D communication to assist with, for example, offloading from the cellular network comprising the cell 10 and eNB 12.

Primarily due to their location within the cell, UEs 14, 16 and 18 are arranged to seek radio resources by way of D2D Scheduled Mode resource allocation.

In this manner the eNB transmits signalling A to the UEs 14, 16, 18 providing a D2D scheduled resource pool configuration. A particular one 14 of the UEs wishing to initiate D2D communication signalling then returns a D2D resource request B to the eNB 12 which, in turn, replies with a D2D resource response C assigning the particular radio resources to be employed by the UE 14 which can then commence its D2D transmission D as required.

With regard to the UEs 20, 22, 24 which, generally due to their more outer cell-location are arranged to seek radio resource allocation in accordance with D2D Autonomous Mode allocation, the eNB 12 provides signalling E to the UEs 20, 22, 24 providing a D2D autonomous resource pool configuration. This resource-pool configuration provides a list of radio resources that can be selected for use by the UE seeking to initiate D2D transmission.

In the illustrative example, the UE 20 is arranged to select at least one radio resource from the resource pool received in signalling E from the eNB 12, and then to commence its D2D transmissions F in accordance with such radio resource(s).

Thus in summary, D2D Scheduled Mode dictates that UEs willing to transmit D2D information according to that mode should request radio resource scheduling whereas, for D2D Autonomous Mode, UEs willing to transmit D2D information should employ, and make a selection from, a configured autonomous mode resource pool.

As appreciated from the description of the inventive concept outlined above, and the following discussions, a particular aspect of the present invention proposes new radio configuration parameters from the network to allow control of D2D Autonomous Mode in terms of radio resource usage and transmission behaviour. Further, novel indications can also be sent by the D2D UEs to the network to adapt the radio resource used for D2D autonomous mode according to the network need.

In particular, the present invention can prove particularly advantageous in addressing issues related to autonomous mode resource allocation and specifically to those relating to the radio resource pool employed for Autonomous Mode allocation. As one particular example, it is identified that if the Autonomous Mode pool is small having regard to the number of UEs seeking autonomous operation, this can lead to insufficient QoS for the proximity service users. Alternatively, if the Autonomous Mode pool is too large having regard to the number of potential users, this can lead to inefficient use of the D2D radio resources particularly insofar as any such unused resources could be employed for legacy cellular communication which of course has an impact on network capacity.

The present invention proves advantageous in addressing such issues.

As will be appreciated the invention can adapt operational characteristics for terminal devices, such as a UE and eNB, and also the signalling for support these characteristics. In further detail of a particular embodiment, a default Radio Resource allocation mode for D2D communication is introduced for each cell, and which can determine the behaviour of the UEs in the cell. For example, in a "Default Scheduled Mode (SM)", the UEs are required to send resource requests to the eNB prior to any transmission according to resources in the Autonomous Mode (AM) pool. The eNB can decide, on an individual request basis, if the requesting UE should be served via SM or be allowed to use AM under certain conditions, such as for example related to time, observed quality of D2D service or transmitted data volume, and which can be prescribed by the eNB. Thus, an "authorized" UE can then use AM as long as the configured conditions are met. Subsequently it can send a new request to eNB (provided it still has data to transmit). However in a "Default AM Mode", the UEs are allowed to use AM, and thus have access to, and select from, the AM pool without prior authorization from the eNB. Thus depending on eNB configuration, such UEs may either remain in AM indefinitely, or only as long as some condition on observed D2D QoS is met. It should be noted that even in the "indefinite use" configuration, the eNB may request optionally the reporting of observed QoS (either periodically or based on triggers). As an example, the "QoS" criteria can be based on various metrics associated with the protocol used in the AM pool.

The functionality allows the eNB to control the use of AM in different ways, and advantageously making various policies/strategies available for network operators. Possible examples of the use of such functionality are outlined as follows.

The first comprises a so-called pro-active tight-control approach and in which, starting from a default mode setting "Default SM", the eNB is aware of all UEs willing to use D2D and the eNB can dynamically predict the load of the AM pool. If it identifies some upcoming bottleneck, it can change the size of AM pool through a SIB change procedure. However, since this is likely only to have a "mid-term" effect, it can instantaneously move the requesting UEs to SM and therefore a different pool of resources. In the same way, eNB can predict under-use of AM pool and change its size if appropriate.

A second example comprises a so-called reactive loose-control approach. Here an insufficient AM pool will be detected by the eNB through QoS-triggered reporting. Although the eNB will not individually control UEs, it will however extend AM pool via a SIB procedure. In this configuration, the under-use of the AM pool can be detected via the observed-QoS reporting if activated by eNB.

As will therefore be appreciated, the setting of conditions and associated values is particularly advantageous in allowing the eNB/operator to make trade-offs between control efficiency and signalling cost.

Figure 2:
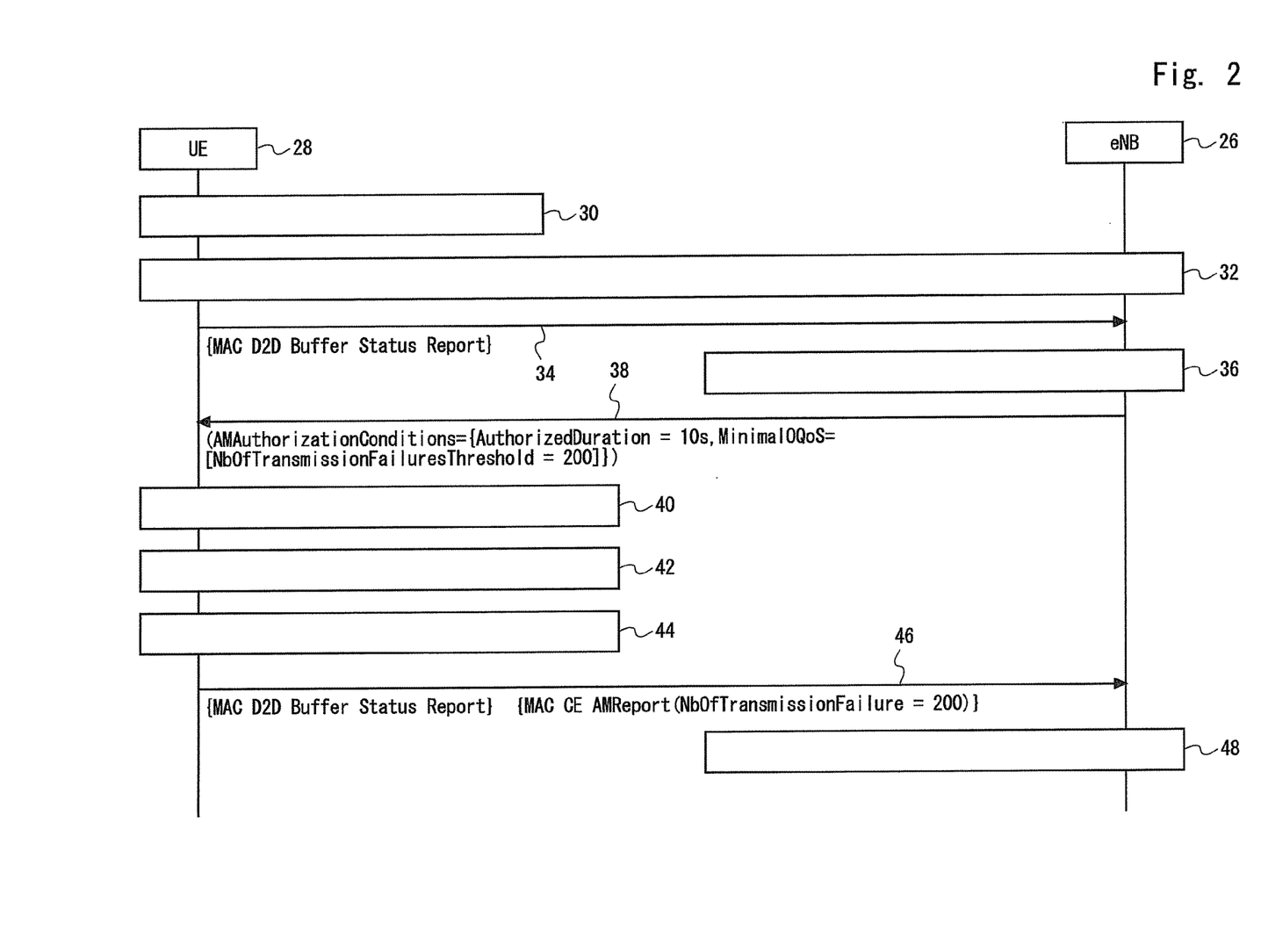
FIG. 2 is a signalling diagram between a network terminal and mobile terminal and for radio resource allocation management according to one embodiment of the present invention.

Reference is now made to FIG. 2 which comprises an illustration of signalling between a eNB 26 and a UE 28 and related to the exemplary parameters, and wherein the network behaviour by involves "Scheduled Mode" resource allocation.

At 30, the "DefaultProSeRRAMode" information is set to "SM" and is broadcast to all UEs camping on the cell or the "SM " is default UE implementation mode. Then at steps 32, 34, and for a UE 28 willing to transmit for D2D service, a random access or scheduled request procedure 32 is initiated and the UE 28 sends a MAC D2D Buffer Status Report 34 as a Radio Resource request to the eNB 26 according to the default behaviour.

The eNB responds 36 to the request either by an individual allocation of Resource Blocks so that the SM is used to serve the UE, or by an explicit "AMAuthorization" message 38 sent to the requesting UE 28. This authorization includes a configuration defining the behavior expected of the UE 28 and a "AMAuthorizationCondition" parameter which describes the condition under which the authorization is given to the UE 28. A "AMReportingOptions" parameter is also included and which describes how the UE 28 is expected to report its use of AM.

Then at 40-44 the authorization procedure continues such that at 40 the UE starts all internal processes related to the received authorized message 38, at 42 the UE can operate in AM for ProSe/D2D transmissions, and at 44 it is determined whether a "NbrOfTransmissionFailuer" threshold has been reached. When the "AuthorizationCondition" as defined in the received configuration is no longer met, the UE stops using AM, and reports 46 to the eNB according to the "ReportingOption", using an "AMReport" message, possibly along with a new request for radio resources if more are needed. At 48, the eNB 28 may take further action based upon the UE "AMReport" message. Such further action can comprise control to move the UE 28 in SM mode if the amount of radio resources requested by the UE can be served in such mode, otherwise the UE is left in AM mode and the procedure can return to the step initiated by signalling 38.

A second exemplary scenario is now described wherein the network behaviour radio resource by default comprises "Autonomous Mode" and is illustrated with reference to FIG. 3 again with an eNB 26 and UE 28 pair exchanging signalling.

Figure 3:
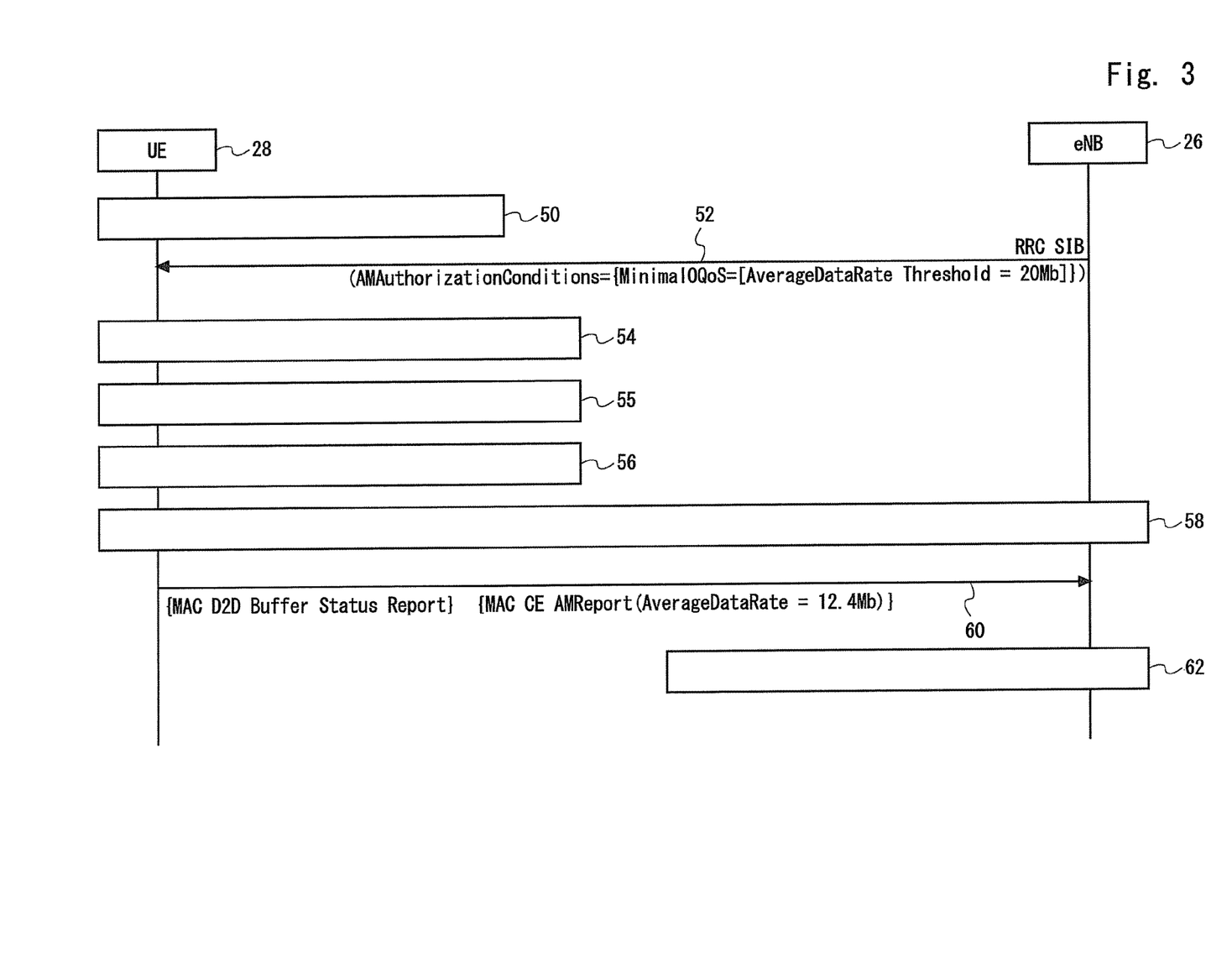
FIG. 3 is a signalling diagram between a network terminal and mobile terminal and for radio resource allocation management according to another embodiment of the present invention.

The "DefaultProSeRRAMode" information is set to "AM" 50 and is broadcast to all UEs camping on the cell or the "AM" is default UE implementation mode.

Such by-default authorization includes a configuration 52 defining the behavior expected from all UEs in the cell when using AM for D2D, and which includes an "AMAuthorizationCondition" parameter which describes the condition under which the authorization is given to the UE 28, and a "AMReportingOptions" parameter which describes how the UE 28 is expected to report its use of AM to the network.

A UE 28 willing to transmit as part of a D2D service is, by default, allowed to use the AM pool and internal processes 54, 55 and 56 start in the UE 28 to employ AM resource allocation. That is at 54 the UE 28 starts all internal processes related to received AMAuthorizationConditins, and can start computing AverageDataRate vaues. At 55 the UE operates in AM for ProSe/D2D transmissions and at 56 it is determined if the AvergaeDataRate threshold reached.

As and when the "AuthorizationCondition" defined in the received configuration is no longer met, a random access or scheduling request procedure 58 is initiated and the UE 28 can request/report 60 to the eNB 26 according to the "ReportingOption", using an "AMReport" message. A new request for radio resources can be made if more are needed.

Finally, at 62, the eNB 28 can take further action upon receipt of the UE "AMReport" message. This further control action can comprise a move the UE in SM mode if the amount of radio resources requested can be served in such mode, otherwise the UE can be left functioning in AM mode and with a return to the procedure initiated by step.

A further exemplary scenario is wherein the network behaviour by default is again "Autonomous Mode" and is illustrated with reference to FIG. 3 again with reference to eNB 26 and UE 28. Here, the AM mode is to be applied as default but without conditions, i.e. only reporting requirements.

The "DefaultProSeRRAMode" information is set to "AM" 64 and is broadcast to all UEs camping on the cell or the " AM " is default UE implementation mode.

As before, this by-default authorization includes a configuration 66 defining the behavior expected from all UEs in the cell when using AM for D2D services and which includes, an "AMReporting" parameter which describes the condition under which the authorization is given to the UE.

A UE 28 willing to transmit as part of a D2D service is allowed, by default, to use the AM pool and internal processes 68, 70 72 start in the UE 28 to employ AM resource allocation. That is at 68 the UE 28 starts all internal processes related to received AMAuthorizationConditins, and can start computing AverageDataRate vaues. At 70 the UE operates in AM for ProSe/D2D transmissions and at 72 it is determined if the AvergaeDataRate threshold reached.

As and when the "AuthorizationCondition" defined in the received configuration is no longer met, a random access or scheduling request procedure 74 is initiated and the UE 28 can request/report 76 to the eNB 26 according to the "ReportingOption", using an "AMReport" message. A new request for radio resources can be made if more are needed.

At 78, the eNB can as before take further action upon receipt of the UE "AMReport" message. Such controlling action can comprise an increase in AM pool size and if the pool sizes increased at 78, the UE can continue at 80 to operate in AM for D2D transmissions.

Figure 4:
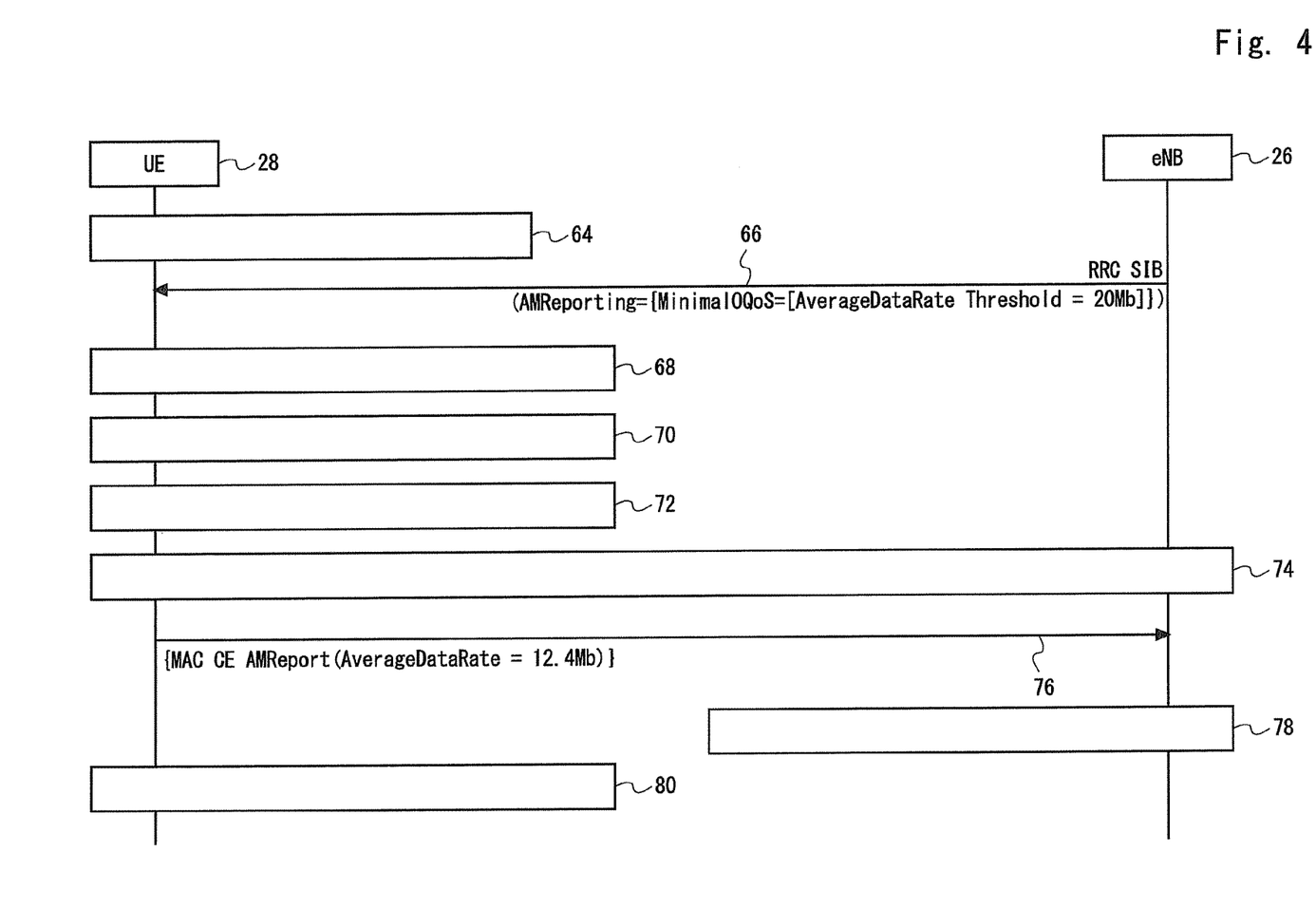
FIG. 4 is a signalling diagram between a network terminal and mobile terminal and for radio resource allocation management according to yet another embodiment of the present invention.
Figure 5:
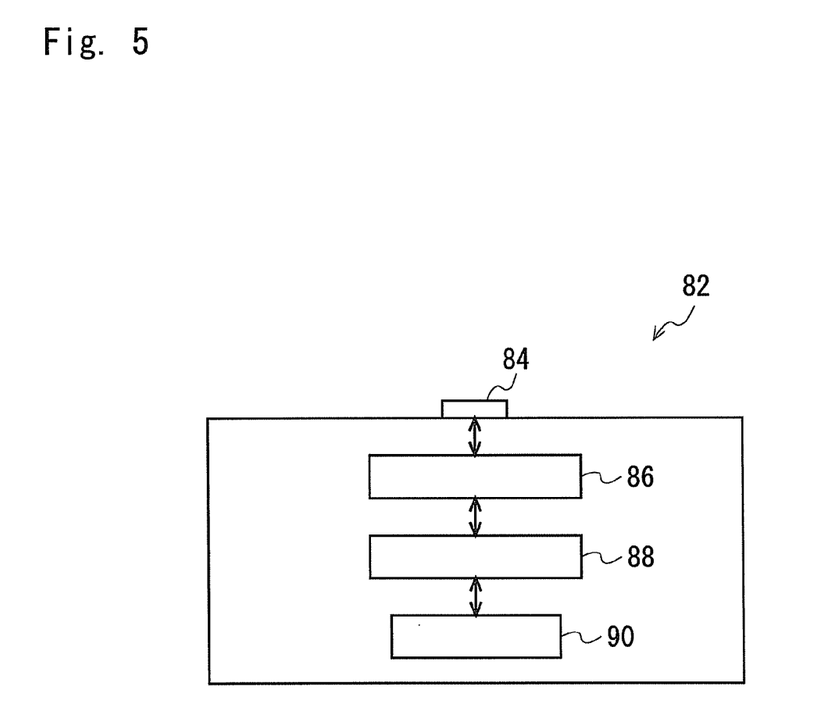
FIG. 5 is a schematic representation of a network terminal device according to an embodiment of the present invention.

Turning now to FIG. 5, there is provided a schematic illustration of a network terminal device, such as an eNB 82 arranged to operate according to appropriate signalling steps of either of FIGS. 2, 3 and 4 as discussed above.

The network terminal device 82 contains the functionality of an interface 84 connected to transmission/reception circuitry 86 which, in turn, is operatively connected to a controller 88 operatively connected to memory functionality 90.

As will be appreciated, the controller 88 with the transmission/reception circuitry 86 and the memory functionality 90 for controlling both cellular signalling for the cellular communication between UE devices within its cell, and also D2D communication between such UE devices and as outlined in relation to the system and methods discussed above. The controller 88 when providing for D2D communication between UE devices, is first arranged to confirm a default radio resource allocation mode for the cell, so that UEs seeking D2D communication can identify the default mode. The controller 88 can determine whether or not the UE should change from the default mode and so whether or not to seek radio resource allocation via Autonomous Mode or Scheduled Mode. If autonomous mode is to be employed, the controller 88 is arranged to forward authorisation signalling containing authorisation conditions/reporting parameters which the UE should meet if it is to continue to operate in Autonomous Mode. The controller 88, by way of the transmitter/receiver circuitry 86 is arranged to receive signalling reports from the UE indicating whether or not the operational requirements are still met, and so as to determine whether control signalling is to be subsequently issued to the UE to re-assert, or switch, the resource allocation mode.

As noted above, FIG. 6 comprises a schematic diagram of a mobile radio communications device such as a UE 92 including standard mobile radio communications device functionality such as an antenna 94 operatively connected to transmission/reception circuitry 96 operatively connected to control circuitry 98 which is in turn, connected to memory functionality 100 and a user interface 102. As again illustrated schematically, the control circuitry 98 includes first 104 and second 106 elements arranged to control the radio resource allocation mode adopted by the device 92. That is, a first element 104 of the control circuitry 98 is arranged via, the transmission/reception circuitry 96, to receive Autonomous Mode authorisation signalling from a network device, such as for example the eNB of FIG. 5. In accordance with the functionality discussed above, the authorisation signalling includes one or more conditions relating to operational characteristics and/or reporting requirements to be met by the UE in order to continue to operate in accordance with the assigned Autonomous Mode. The first element 104 of the control circuitry is therefore arranged to identify such conditions and monitor on and ongoing basis whether such conditions continue to be met.

Figure 6:
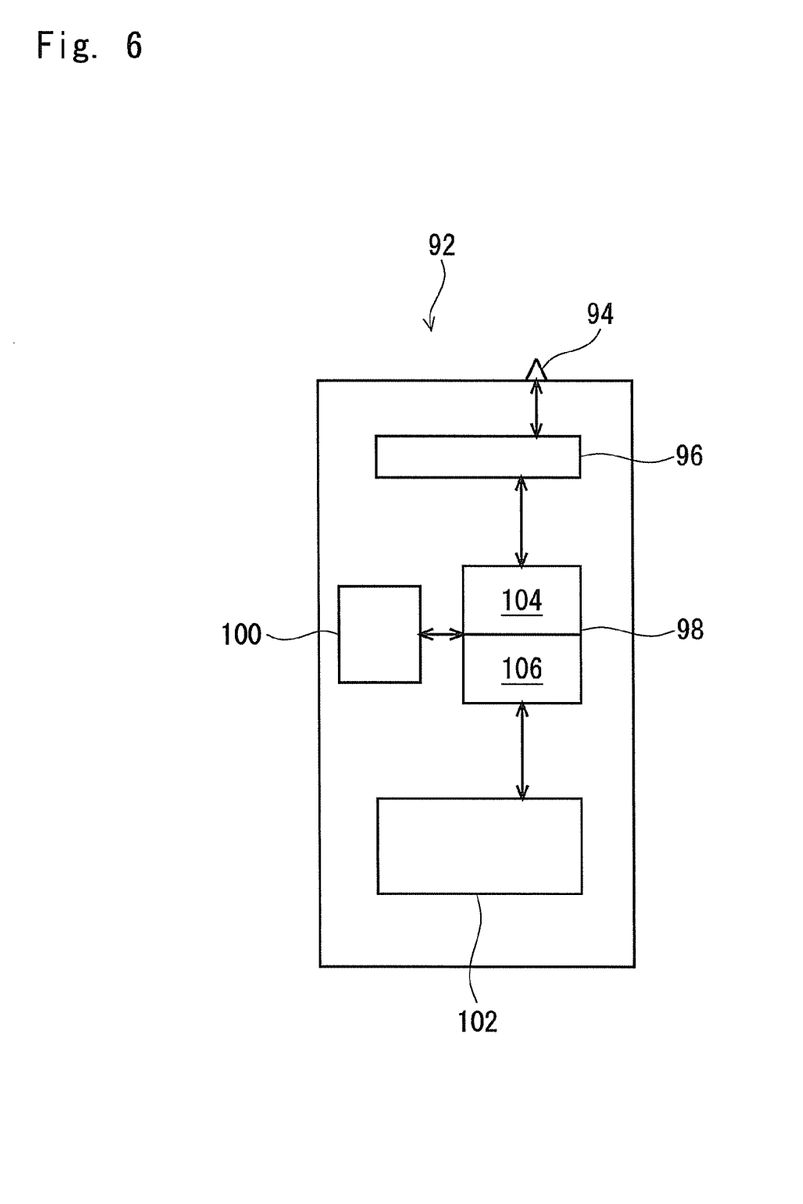
FIG. 6 is a schematic representation of a mobile terminal device according to an embodiment of the present invention.

If such conditions are no longer met, then the second element 106 of the control circuitry 98 is arranged to establish appropriate reporting signalling and transmit the same by way of the transmission/reception circuitry 96 to two the network device. The control circuitry 96 can then be arranged to receive further control signalling from the network device which can determine that are not Autonomous Mode operation is retained, or whether the radio resource allocation mode is switched to, for example, Schedule Mode as discussed above.

Further detail of various examples of configuration options and parameters of the present invention are outlined below.

The "AMAuthorizationConditions" parameter can take any one or more of the following values.

"AuthorizedDuration" requires that the UE should only use AM during a certain time (value provided within the parameter).

"AuthorizedRBNb" requires that the UE should only use AM for a certain number of Resource Blocks.

"AuthorizedDataTransfer" requires that the UE should only use AM for a certain amount of data.

"MinimalOQoS" requires that the UE should only use AM as long as a minimal observed QoS is met. The parameter includes a sub-parameter "AMOQoSMetrics" to be used for QoS observation. An example of such a metric is the actual rate of successful transmission of data transferred over a sliding window of time or a "MAxNbofTransmissionFailure". A further sub-parameter "AMO-QoSThreshold" can also be included and to be used for QoS checking. Any one or more of the above conditions can form part of the configuration and in which case the UE should take into account a logical "AND" of all conditions present in the received configuration.

In the absence of "AMAuthorizationConditions" information, as an option, it can be determined at the UEs that there is no limit to the use of the AM and the AM pool.

Sub-parameters can also be proved for the"AMReportingOptions" parameter. That is "AMReportRequestedIndication" can be used for the UE to identify if it is expected to report to eNB.

"AMReportPeriod" can be used for the UE to determine if it is expected to report to eNB on a periodical basis and, if so, at which level of periodicity.

"AMReportOQoSMetricsType" can be used for the UE to identify which metrics it must use—for reporting. This can be similar to the "AMOQoSMetrics" sub-parameters introduced above.

Signalling options for both scenarios can be as follows:

"DefaultProSeRRAMode" information can be added to SIB messaging as a new IE. That is "SM" or "AM" can be defined as the default Radio Resource Allocator mode-setting if no information is present in the SIB.

"AMAuthorization" can be implemented using a new MAC Control Element. Further AMAuthorization configuration parameters, such as "AMAuthorizationConditions" and "AMReportingOptions", can be carried either as a new IE by SIB (for cell-wide values) or AMAuthorization MAC CE (for UE-specific values) or by a new RRC dedicated message (for UE-specific values).

The "AMReport" signalling can carry information such as "AMReportType" to indicate to an eNB whether this is a periodic report or one triggered by threshold-passing, or "AMReportOQoSMetricsType", which can have the same structure as in AMReportingOptions above. "AMReportOQOSMetricsValue", can serve to carry the actual value of the metric and can be implemented either as a new MAC Control Element, or as a new dedicated RRC message.

As will be appreciated from the above, particular advantages arise in relation to the present invention which enables real time autonomous pool management for ensuring appropriate QoS for UEs in autonomous mode resource allocation. In such scenarios, typically the eNB could immediately serve a UE by way of Scheduled Mode allocation if problems are likely to be experienced in autonomous mode. Further the invention can enable a trade-off between signalling load and efficiency of autonomous pool management, typically by adjusting the duration of authorization. Still further, an eNB can determine which UEs are involved in D2D signalling at any particular time. This can prove further advantageous in providing greater accuracy than can be achieved by reference to the mere number of D2D capable UEs and can thereby allow for much more accurate, detailed, i.e. fine-grained, management of radio resources within a cell.

It should of course be appreciated that the invention is not restricted to the details of the foregoing illustrated embodiment and can be provided in relation to any appropriate wireless network communication environment employing appropriate network terminal and mobile devices as required.

The program can be stored and provided to the computer device using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W(CD-ReWritable), and semiconductor memories (such as mask ROM, PROM (Programmable ROM), EPROM (Erasable PROM), flash ROM, RAM (Random Access Memory), etc.). The program may be provided to the computer device using any type of transitory computer readable media. Examples of transitory computer readable media include electric signals, optical signals, and electromagnetic waves. Transitory computer readable media can provide the program to the computer device via a wired communication line, such as electric wires and optical fibers, or a wireless communication line.

This application is based upon and claims the benefit of priority from United Kingdom patent application No. 1404952.2, filed on Mar. 19, 2014, the disclosure of which is incorporated herein in its entirety by reference.

REFERENCE SIGNS LIST 10 cell
12 eNB
14-24 UE
26 eNB
28 UE
82 network terminal device
84 interface
86 transmission/reception circuitry
88 controller
90 memory functionality
92 UE
94 antenna
96 transmission/reception circuitry
98 control circuitry
100 memory functionality
102 user interface
104 first element
106 second element

The invention claimed is:

1. A method of indicating radio resources in accordance with a radio resource allocation mode to a mobile radio communications device that supports device-to-device communication within a wireless communication network environment, wherein the mobile radio communications device can operate in two modes for resource allocation comprising a scheduled resource allocation mode and an autonomous resource selection mode, and wherein the mobile radio communication device is configured to use scheduled resource allocation, the method including:

signaling, by the mobile radio communications device to a base station, a buffer status report (BSR);

signaling, from the base station to the mobile radio communications device a first configuration information element (IE) using a system information block (SIB), the first configuration IE identifying a pool of radio resources to be used in the autonomous resource selection mode for the device-to-device communication;

signaling, from the base station to the mobile radio communications device, a second configuration IE defining a time period, using RRC dedicated signaling, the mobile radio communications device beginning to use the autonomous resource selection, using the pool identified by the first configuration IE, when currently configured to use scheduled resource allocation, signaling, from the base station to the mobile radio communications device a third configuration IE for configuring a communication metric, a measured value of the communication metric being to be reported by the mobile radio communications device; and signaling, by the mobile radio communications device to the base station, a report reporting the measured value of the communication metric configured by the third configuration IE;

wherein the mobile radio communications device uses, based on the measurement value of the communication metric, the pool identified by the first configuration IE for the time period defined by the second configuration IE signaled by the base station using the RRC dedicated signaling.

2. The method as claimed in claim 1, wherein the first configuration IE includes an indication of a maximum number of radio resources to be offered to the mobile radio communications device.

3. A non-transitory computer readable medium storing computer program product for a computer device, and the computer program containing software code which, when loaded onto a computer device, causes the computer device to perform a method as claimed in claim 1.

4. A system for indicating radio resources in accordance with assigning a radio resource allocation mode to a mobile radio communications device that supports device to device communication within a wireless communication network environment wherein the mobile radio communications device can operate in two modes for resource allocation comprising a scheduled resource allocation mode and an autonomous resource selection mode and wherein the mobile radio communication device is configured to use scheduled resource allocation, the system comprising:

a mobile radio communications device; and
a base station;

wherein the mobile radio communications device is configured to signal, to a base station, a buffer status report (BSR), wherein the base station is configured to:
signal, to the mobile radio communication device a first configuration information element (IE) using a system information block (SIB), the first configuration IE identifying a pool of radio resources to be used in the autonomous resource selection mode for the device-to-device communication, and signal, to the mobile radio communications device, a
second configuration IE using RRC dedicated signaling, the second configuration IE defining a time period,
wherein the mobile radio communications device is further configured to begin to use the autonomous resource selection, using the pool identified by the first configuration IE, when currently configured to use scheduled resource allocation,
wherein the base station is further configured to signal, to the mobile radio communication device, a third configuration IE for configuring a communication metric, a measured value of the communication metric being to be reported by the mobile radio communications device,
wherein the mobile radio communications device is further configured to report, to the base station, the measured value of the communication metric configured by the third configuration IE, and
wherein the mobile radio communications device is further configured to use, based on the measurement value of the communication metric, the pool identified by the first configuration IE for the time period defined by second configuration IE signaled by the base station using the RRC dedicated signaling.

5. The system as claimed in claim 4 and wherein and wherein at least one of the first configuration IE data and the second configuration IE comprises:
a maximum number of radio resources to be offered to the mobile radio communications device; or
parameters relating to a length of the time period that the mobile radio communications device can remain in the autonomous resource selection mode.

6. A base station of a wireless communication network, the base station comprising:
a controller; and
a transceiver connected to the controller, and
wherein the controller is configured to control the transceiver to:
receive a buffer status report (BSR) signaled by a mobile radio communications device;
indicate radio resources in accordance with a radio resource allocation mode to a mobile radio communications device that supports device-to-device communication within a wireless communication network environment, wherein the mobile radio communications device can operate in two modes for resource allocation comprising a scheduled resource allocation mode and an autonomous resource selection mode;
signal a first configuration information element (IE), using a system information block (SIB), the first configuration IE identifying a pool of radio resources to be used in the autonomous resource selection mode for the device-to-device communication;
signal a second configuration IE, using RRC dedicated signaling, the second configuration IE defining a time period;
signal a third configuration IE for configuring a communication metric, a measured value of the communication metric being to be reported by the mobile radio communications device; and
receive a report reporting the measured value of the communication metric configured by the third configuration IE,
wherein the time period defined by the second configuration IE is a time period during which the mobile radio communications device uses, based on the measurement value of the communication metric, the pool identified by the first configuration IE.

7. A mobile radio communications device that supports device-to-device communication within a wireless communication network, the mobile radio communications device comprising:
a controller; and
a transceiver connected to the controller;
wherein the controller is configured to:
control the mobile radio communications device to operate in any of two modes for resource allocation, the modes comprising a scheduled resource allocation mode and an autonomous resource selection mode;
control the transceiver to transmit, to a base station, a buffer status report (BSR);
control the transceiver to receive, from the base station, a first configuration information element (IE) using a system information block (SIB), the first configuration IE identifying a pool of radio resources to be used in the autonomous resource selection mode for the device-to-device communication;
control the transceiver to receive, from the base station, a second configuration information IE using RRC dedicated signaling, the second configuration IE defining a time period;
control the transceiver to receive, from the base station, a third configuration IE for configuring a communication metric, a measured value of the communication metric being to be reported by the mobile radio communications device;
control the transceiver to report, to the base station, the measured value of the communication metric configured by the third configuration IE; and
control the mobile radio communication device to begin to use the autonomous resource selection, using the pool identified by the first configuration IE, when currently configured to use scheduled resource allocation,
wherein the controller is configured to control the mobile radio communications device to use, based on the measurement value of the communication metric, the pool identified by the first configuration IE for the time period defined by second configuration IE signaled by the base station using the RRC dedicated signaling.

8. A method performed by a mobile radio communications device, that supports device-to-device communication within a wireless communication network environment and that can operate in two modes for resource allocation comprising a scheduled resource allocation mode and an autonomous resource selection mode the method comprising:
transmitting, to a base station, a buffer status report (BSR);
receiving, from the base station, a system information block (SIB) comprising a first configuration information element (IE), the first configuration IE identifying a pool of radio resources to be used in the autonomous resource selection mode by the mobile radio communication device for the device-to-device communication;
receiving, form the base station, RRC dedicated signaling comprising a second configuration IE defining a time period;

receiving, from the base station, a third configuration IE for configuring a communication metric, a measured value of the communication metric being to be reported by the mobile radio communications device;

reporting, to the base station, the measured value of the communication metric configured by the third configuration IE; and beginning to use the autonomous resource selection, using the pool identified by the first configuration IE, when currently configured to use scheduled resource allocation, wherein the pool identified by the first configuration IE is used, based on the measurement value of the communication metric, for the time period defined by second configuration IE signaled by the base station using the RRC dedicated signaling.

9. A method, performed by a base station, of indicating radio resources in accordance with a radio resource allocation mode to a mobile radio communications device that supports device-to-device communication within a wireless communication network environment wherein the mobile radio communications device can operate in two modes for resource allocation comprising a scheduled resource allocation mode and an autonomous resource selection mode, the method comprising:

receiving a buffer status report (BSR) signaled by a mobile radio communications device;

signaling a first configuration information element (IE) using a system information block (SIB), the first configuration IE identifying a pool of radio resources to be used in the autonomous mode for the device-to-device communication;

signaling a second configuration IE using RRC dedicated signaling, the second configuration IE defining a time period;

signaling a third configuration IE for configuring a communication metric, a measured value of the communication metric being to be reported by the mobile radio communications device; and receiving a report reporting the measured value of the communication metric configured by the third configuration IE, wherein the time period defined by the second configuration IE is a time period during which the mobile radio communications device uses, based on the measurement value of the communication metric, the pool identified by the first configuration IE.

* * * * *